(12) United States Patent
Griffin et al.

(10) Patent No.: US 11,060,658 B2
(45) Date of Patent: Jul. 13, 2021

(54) GIMBAL STABILIZATION SYSTEM AND METHOD

(71) Applicant: Aurora Flight Sciences Corporation, Manassas, VA (US)

(72) Inventors: Riley Griffin, Manassas, VA (US); Jeffery Saunders, Manassas, VA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 218 days.

(21) Appl. No.: 15/816,107

(22) Filed: Nov. 17, 2017

(65) Prior Publication Data

US 2018/0135798 A1    May 17, 2018

Related U.S. Application Data

(60) Provisional application No. 62/423,505, filed on Nov. 17, 2016.

(51) Int. Cl.
*G05B 6/02* (2006.01)
*F16M 11/20* (2006.01)
(Continued)

(52) U.S. Cl.
CPC .......... *F16M 13/02* (2013.01); *B64C 39/024* (2013.01); *B64D 47/08* (2013.01); *F16M 11/18* (2013.01);
(Continued)

(58) Field of Classification Search
CPC .... F16M 13/02; F16M 11/18; F16M 11/2007; F16M 2200/04; B64C 39/024;
(Continued)

(56) References Cited

U.S. PATENT DOCUMENTS 3,085,443 A    4/1963 Manteuffel
3,277,468 A   10/1966 Caspers
(Continued)

FOREIGN PATENT DOCUMENTS

JP    S60 170777 A    9/1985

OTHER PUBLICATIONS

ST Microelectronics H3LIS331DL MEMS motion sensor. Datasheet [online], ST Microelectronics corporation, 2013 [retrieved on Jul. 16, 2019] Retrieved from the Internet <URL: https://www.st.com/resource/en/datasheet/h3lis331dl.pdf> (Year: 2013).*

(Continued)

*Primary Examiner* — Kenneth M Lo
*Assistant Examiner* — Jonathan Michael Skrzycki
(74) *Attorney, Agent, or Firm* — Michael Stanley Tomsa; McAndrews, Held & Malloy, Ltd.; Eugene H. Nahm

(57) ABSTRACT

A gimbal stabilizing system for an aircraft having an airframe is disclosed. The gimbal stabilizing system may comprise a gimbal apparatus having at least one gimbal actuator to adjust a position of the gimbal apparatus about an axis, wherein the gimbal apparatus is positioned on the airframe, an angular acceleration apparatus positioned on the airframe to generate an angular acceleration signal reflecting an angular acceleration of the airframe, and a gimbal controller operatively coupled to each of said angular acceleration apparatus and said gimbal apparatus. The gimbal controller may be configured to generate a gimbal control signal to compensate for the angular acceleration of the airframe based at least in part on a feedback control loop and a feedforward control loop, the feedforward control loop having the angular acceleration signal as an input thereto. The gimbal controller may be further configured to output the gimbal control signal to said gimbal apparatus to adjust a position of the gimbal apparatus.

19 Claims, 10 Drawing Sheets

(51) Int. Cl.
  *B64D 47/08* (2006.01)
  *F16M 11/18* (2006.01)
  *F16M 13/02* (2006.01)
  *B64C 39/02* (2006.01)
(52) U.S. Cl.
  CPC ........... *F16M 11/2007* (2013.01); *G05B 6/02*
    (2013.01); *B64C 2201/123* (2013.01); *B64C*
    *2201/127* (2013.01); *F16M 2200/04* (2013.01)
(58) Field of Classification Search
  CPC ........ B64C 2201/127; B64C 2201/123; B64D
    47/08; G05B 6/02
  See application file for complete search history.

(56) References Cited

U.S. PATENT DOCUMENTS

| | | | |
|---|---|---|---|
| 3,976,999 | A | 8/1976 | Moore et al. |
| 4,238,090 | A | 12/1980 | French |
| 4,267,562 | A | 5/1981 | Raimondi |
| 5,124,938 | A | 6/1992 | Algrain |
| 5,136,295 | A | 8/1992 | Bull et al. |
| 5,172,118 | A | 12/1992 | Peregrim et al. |
| 6,122,595 | A | 9/2000 | Varley et al. |
| 6,491,253 | B1 | 12/2002 | McIngvale |
| 6,914,554 | B1 | 7/2005 | Riley et al. |
| 6,960,750 | B2 | 11/2005 | Doane |
| 3,049,870 | A1 | 11/2011 | Mosier et al. |
| 8,825,436 | B2 | 9/2014 | Zhang et al. |
| 9,562,773 | B2 | 2/2017 | Paduano et al. |
| 9,568,919 | B2 | 2/2017 | Lim |
| 2003/0196490 | A1* | 10/2003 | Cardarelli ............... G01P 15/18 73/504.02 |
| 2013/0158940 | A1* | 6/2013 | Crane, III ............... G06F 17/00 702/141 |
| 2015/0041598 | A1 | 2/2015 | Nugent et al. |
| 2015/0274504 | A1 | 10/2015 | Kitai et al. |
| 2015/0293225 | A1 | 10/2015 | Riley et al. |
| 2016/0274222 | A1 | 9/2016 | Yeun |
| 2017/0078587 | A1* | 3/2017 | Guo ................... G08B 13/1963 |
| 2019/0011077 | A1* | 1/2019 | Chen ..................... B64C 17/00 |
| 2019/0162358 | A1* | 5/2019 | Wang .................... F16M 11/18 |

OTHER PUBLICATIONS

Thomas E. Marlin, Process Control, 2015, McGraw-Hill, p. 483 introduction to feedforward control, Retrieved from the internet <URL: http://pc-textbook.mcmaster.ca/Marlin-Ch15.pdf> (Year: 2015).*
A. J. Padgaonkar et al., "Measurement of Angular Acceleration of a Rigid Body Using Linear Accelerometers," J. Appl. Mech 42(3), 552-556 (Sep. 1, 1975).
Marcelo C. Algrain, "Accelerometer-based platform stabilization", Proc. SPIE 1482, Acquisition, Tracking, and Pointing V, 367 (Aug. 1, 1991); doi:10.1117/12.45711.
Russell T. Rudin, "Strapdown Stabilization for Imaging Seekers," 2nd Annual AIAA SDIO Interceptor Technology Conference, Jun. 6-9, 1993/ Albuquerque, NM.
Barton J. Bacon et al., "Reconfigurable Flight Control Using Nonlinear Dynamic Inversion with a Special Accelerometer Implementation," American Institute of Aeronautics and Astronautics, Inc., AIAA-2000-4565, 2000.
Peter J. Kennedy, "Direct Versus Indirect Line of Sight (LOS) Stabilization," IEEE Transactions on Control Systems Technology, vol. 11, No. 1, Jan. 2003.
Stealth Micro Systems—Spectre RDD, Copyright 2001-2017, Stealth Micro Systems Pty Ltd., ABN 83 009 774 403, downloaded from ttp://www.spectre-rdd.com/spectre.asp on Sep. 12, 2017.
Extended European search report dated Nov. 13, 2019 in European Application No. 1917856.6.

* cited by examiner

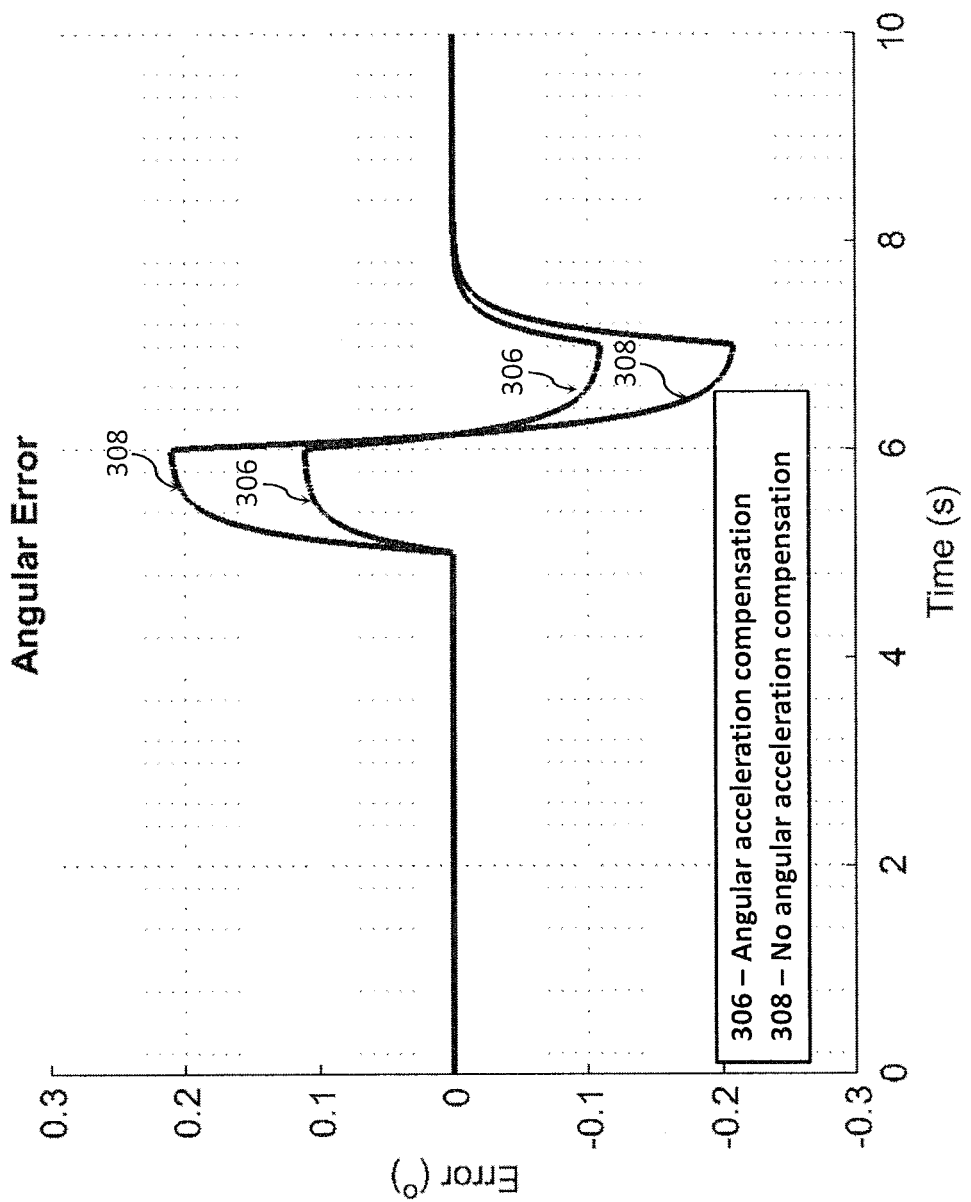

GIMBAL STABILIZATION SYSTEM AND METHOD

CROSS-REFERENCE TO RELATED APPLICATION

The present application claims the benefit under 35 U.S.C. § 119(e) of provisional patent application Ser. No. 62/423,505, filed Nov. 17, 2016, the contents of which are hereby incorporated by reference.

STATEMENT OF GOVERNMENT INTEREST

This invention was made with government support under Contract Number: FA8651-13-C-0017 awarded by United States Air Force. The government has certain rights in the invention.

FIELD OF THE INVENTION

This present invention generally relates to stabilization systems. More particularly, this present invention relates to a stabilization apparatus that operates to stabilize an object when subject to rotational and translational motion.

BACKGROUND

A sensor payload, such as electronic imaging devices, cameras, radar, navigation instruments, and the like are frequently carried by and operated in a moving vehicle (e.g., an aircraft) that undergoes rotational motions about its center of rotation. In such an environment, the equipment may be mounted on a movable platform that is stabilized with respect to movement of the vehicle. Example moveable platforms include gimbals. A gimbal is a device that is suspended so it can rotate about an axis. Gimbals are typically nested one within another to accommodate rotation about multiple axes. Gimbals are often used with gyroscopes and inertial measurement units to allow the inner gimbal's orientation to remain fixed while the outer gimbal suspension assumes any orientation. In compasses and flywheel energy storage mechanisms, for example, gimbals allow objects to remain upright. More recently, gimbals have been used to provide gyro-stabilized optical/infrared (EO/IR) camera payloads. For example, an EO/IR camera payload may be gyro-stabilized in two or three axis, using 3, 4, 5, or more gimbals.

Gimbal stabilization refers to the method of maintaining a gimbal position or angle constant in the inertial frame while in the presence of aircraft motion disturbance. An aircraft motion disturbance may include, for example, turbulence, a gust of wind, a maneuver during flight, etc. The performance of gimbal controllers, however, decreases as angular acceleration of the system increases. Angular acceleration is not monitored using existing gimbal controllers. Therefore, a need exists for a gimbal controller that uses angular acceleration measurements to provide gimbal stabilization. Accordingly, disclosed herein are novel improved gimbal controller systems and methods for providing gimbal stabilization via, for example, a distributed acceleration-sensing package, which may include a centered rate gyroscope with accelerometers placed at distributed locations around the rate gyroscope. As will be discussed, the gimbal controller systems and methods may provide gimbal stabilization by compensating for the angular acceleration about the gimbal center of rotation. The vector from the gimbal center of rotation to the measurement sensors may be a known value. For example, the accelerometers may be placed at a predetermined distance from the vehicle's center of gravity or the gimbal payload's center of gravity.

SUMMARY OF THE INVENTION

Disclosed herein are novel improved gimbal controller systems and methods for providing gimbal stabilization via, for example, a distributed acceleration-sensing package, which may include a centered rate gyroscope with accelerometers placed at distributed locations around the rate gyroscope and at a predetermined distance from the vehicle's center of gravity or the gimbal payload's center of gravity.

According to a first aspect, a gimbal stabilizing system for an aircraft having an airframe, the gimbal stabilizing system comprises: a gimbal apparatus having at least one gimbal actuator to adjust a position of the gimbal apparatus about an axis, wherein the gimbal apparatus is positioned on the airframe; an angular acceleration apparatus positioned on the airframe to generate an angular acceleration signal reflecting an angular acceleration of the airframe; and a gimbal controller operatively coupled to each of said angular acceleration apparatus and said gimbal apparatus, wherein the gimbal controller is configured to generate a gimbal control signal to compensate for the angular acceleration of the airframe based at least in part on a feedback control loop and a feedforward control loop, the feedforward control loop having the angular acceleration signal as an input thereto, and wherein the gimbal controller is configured to output the gimbal control signal to said gimbal apparatus to adjust a position of the gimbal apparatus.

According to a second aspect, a gimbal stabilizing system for an aircraft having an airframe, the gimbal stabilizing system comprises: a gimbal apparatus having at least one gimbal actuator to adjust a position of the gimbal apparatus about an axis, wherein the gimbal apparatus is configured to couple to the airframe; an angular acceleration apparatus positioned on a rigid portion of the gimbal apparatus to generate an angular acceleration signal reflecting an angular acceleration of the gimbal apparatus; and a gimbal controller operatively coupled to each of said angular acceleration apparatus and said gimbal apparatus, wherein the gimbal controller is configured to generate a gimbal control signal to compensate for the angular acceleration of the rigid body based at least in part on a feedback control loop, the feedback control loop having as an input thereto the angular acceleration signal, an angular position of the rigid portion, and an angular rate of the rigid portion, and wherein the gimbal controller is configured to output the gimbal control signal to said gimbal apparatus to adjust a position of the gimbal apparatus.

According to a third aspect, a gimbal stabilizing system comprises: a gimbal apparatus having at least one gimbal actuator to adjust a position of the gimbal apparatus about an axis; an angular acceleration apparatus positioned on a rigid body to generate an angular acceleration signal reflecting an angular acceleration of the rigid body, wherein the angular acceleration apparatus comprises a rate gyroscope and at least three accelerometers; and a gimbal controller operatively coupled to each of said angular acceleration apparatus and said gimbal apparatus, wherein the gimbal controller is configured to generate a gimbal control signal based at least in part on said angular acceleration signal, wherein the gimbal control signal compensate for the angular acceleration of the rigid body, and wherein the gimbal controller is configured to output the gimbal control signal to said gimbal apparatus to adjust a position of the gimbal apparatus.

In certain aspects, the gimbal control signal is generated based at least in part on the angular acceleration signal and an angular position and rate feedback control loop.

In certain aspects, the gimbal control signal is configured to control said at least one gimbal actuator.

In certain aspects, each of the at least three accelerometers is a linear tri-axial accelerometer.

In certain aspects, the gimbal stabilizing system is coupled to an airframe of an aircraft and the rigid body is the airframe.

In certain aspects, the rigid body is a component of the gimbal apparatus.

In certain aspects, the gimbal actuator is motor-driven.

In certain aspects, the gimbal apparatus is a three-dimensional gimbal apparatus.

BRIEF DESCRIPTION OF THE DRAWINGS

The foregoing and other objects, features, and advantages of the devices, systems, and methods described herein will be apparent from the following description of particular embodiments thereof, as illustrated in the accompanying figures, where like reference numbers refer to like structures. The figures are not necessarily to scale, emphasis instead being placed upon illustrating the principles of the devices, systems, and methods described herein.

FIG. 3c illustrates an example graph of a resulting angular error.

FIG. 4b illustrates a top plan view of the example printed circuit board assembly of FIG. 4a.

FIG. 4c illustrates a first side view of the example printed circuit board assembly of FIG. 4a.

FIG. 4d illustrates a second side view of the example printed circuit board assembly of FIG. 4a.

DETAILED DESCRIPTION

Figure 1A:
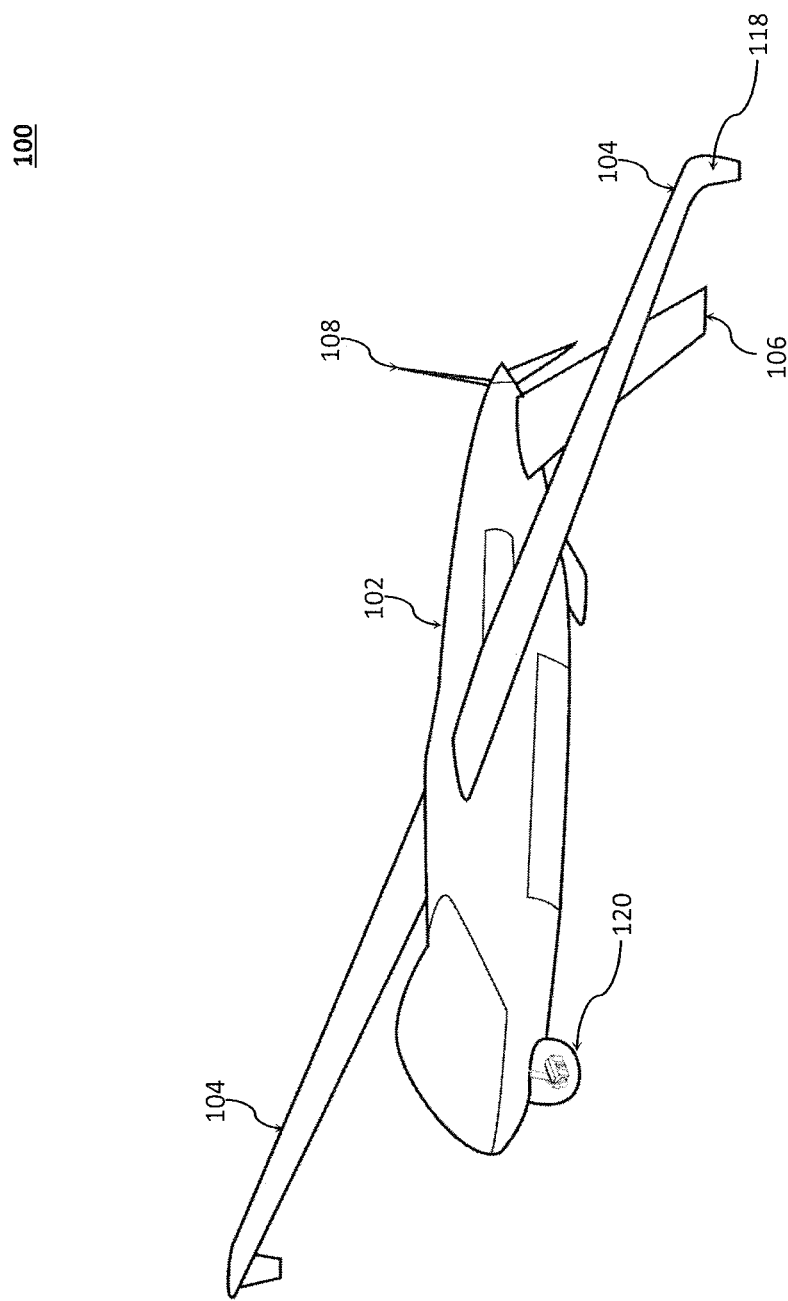
FIG. 1a illustrates a perspective view of an exemplary fixed wing aircraft having a gimbal-equipped sensor payload pod.

Preferred embodiments of the present invention will be described hereinbelow with reference to the accompanying drawings. In the following description, certain well-known functions or constructions are not described in detail since they would obscure the invention in unnecessary detail. The present invention is generally directed to improved gimbal controller systems and methods for providing gimbal stabilization.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within the range, unless otherwise indicated herein, and each separate value within such a range is incorporated into the specification as if it were individually recited herein.

As used herein, the words "about" and "approximately," when used to modify or describe a value (or range of values), mean reasonably close to that value or range of values. Thus, the embodiments described herein are not limited to only the recited values and ranges of values, but rather should include reasonably workable deviations thereof.

The terms "aerial vehicle" and "aircraft" refer to a machine capable of flight, including, but not limited to, fixed wing aircraft, unmanned aerial vehicle, variable wing aircraft, and vertical take-off and landing (VTOL) aircraft.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y, and z".

The terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first set of one or more lines of code and may comprise a second "circuit" when executing a second set of one or more lines of code.

The terms "communicate" and "communicating" refer to (1) transmitting, or otherwise conveying, data from a source to a destination, and/or (2) delivering data to a communications medium, system, channel, network, device, wire, cable, fiber, circuit, and/or link to be conveyed to a destination.

The term "database" as used herein means an organized body of related data, regardless of the manner in which the data or the organized body thereof is represented. For example, the organized body of related data may be in the form of one or more of a table, a map, a grid, a packet, a datagram, a frame, a file, an e-mail, a message, a document, a report, a list, or data presented in any other form.

As utilized herein, the term "exemplary" means serving as a non-limiting example, instance, or illustration. As utilized herein, the terms "e.g." and "for example" set off lists of one or more non-limiting examples, instances, or illustrations.

As utilized herein, circuitry is "operable" to perform a function whenever the circuitry comprises the necessary hardware and code (if any is necessary) to perform the function, regardless of whether performance of the function is disabled or not enabled (e.g., by an operator-configurable setting, factory trim, etc.).

Gimbal stabilization refers to the method of maintaining a gimbal position or angle constant in the inertial frame while in the presence of aircraft motion disturbance. An aircraft motion disturbance may include, for example, a jitter (i.e., a slight irregular movement, variation, or other unsteadiness), turbulence, a gust of wind, a maneuver during flight, etc. Gimbal stabilization may be provided by a gimbal controller through angular rate feed forward compensation. That is, say inertial measurement units/devices (e.g., gyroscopes and other devices) on the aircraft measure angular rate motion and transmit the angular rates to the gimbal controller, which controls movement of the gimbal (or set of gimbals). Using the measurements, the gimbal controller adjusts the motion of the gimbal for a net rate of near zero in the inertial frame to maintain a steady line of sight for sensors on the gimbal (e.g., EO/IR cameras that may be viewing objects). Particular gimbal applications involve the stabilization of the line-of-sight of a camera or other imaging device. In which case, when the vehicle undergoes rotational motion about its axes, the line-of-sight remains fixed with respect to the inertial reference frame of the vehicle.

The performance of existing gimbal controllers, however, decreases as angular acceleration increases. This performance decrease is especially apparent in precision-based activities, such as filming, photographing, and target tracking (e.g., using self-lasing designation techniques). During self-lasing designation, for example, the aircraft must maintain a laser spot on a target for an extended period, which is used for targeting. As can be appreciated, small deviations in gimbal angle (as small as one degree) can cause the payload (e.g., a projectile) to miss the target. During such lasing procedures, pilots would have to manually minimize angular acceleration of the aircraft to indirectly minimize gimbal deviation from the target. The stabilization performance of gimbals can therefore benefit from aircraft angular acceleration measurements, thereby obviating the need for pilots to limit maneuvers during lasing procedures. Likewise, target viewing (e.g., filming and photographing) is difficult when the gimbal jitters during angular acceleration. For example, targets are often viewed at a distance of 10 km (~6.2 miles) or more, which means that 1 milliradian (~0.057°) movement will result in a 10 meter error off target. A jitter of 1 milliradian is therefore unacceptable not only for accurate lasing, but also for viewing the target. Modern gimbal systems may employ software image tracking to maintain target track; however, in the presence of jitter, those algorithms can lose track of the target. Angular acceleration input, as disclosed herein, however will reduce the jitter on the gimbal caused by high angular accelerations that cause target loss and viewing difficulty.

In view of the foregoing, an objective of the present disclosure is to provide improved gimbal controller systems and gimbal stabilization methods in an aerial vehicle. A gimbal controller system in accordance with an aspect of the present invention may employ a rigid body angular acceleration feedforward system. In a feedforward system, the control variable adjustment is not error-based, but rather is based on knowledge about the process in the form of a mathematical model of the process and knowledge about or measurements (e.g., angular acceleration) of the process disturbances. An advantage of feedforward control is that disturbances (e.g., those caused by angular acceleration) are measured and accounted for before the disturbances have time to affect the system. A properly designed feedforward control system can improve control accuracy by as much as an order of magnitude.

Thus, the gimbal controller system may comprise an angular acceleration sensor or sensing system coupled to a rigid body to which a traditional stabilized gimbal payload is mounted. The rigid body may be, for example, the fuselage or wing of an aerial vehicle. The angular acceleration measurements of the rigid body are fed forward to the stabilized gimbal controller's gimbal actuator control input (e.g., via a gimbal controller) to compensate for angular accelerations. The angular acceleration measurements may be integrated with position and rate feedback control loops to result in higher bandwidth stabilization for more accurate tracking. In another aspect, the gimbal controller system may employ a gimbal payload angular acceleration feedback system. That is, the gimbal controller system may comprise an angular acceleration sensor or sensing system mounted to a traditional stabilized gimbal payload to use angular position, rate, and acceleration feedback for stabilization. The stabilized gimbal controller may be configured to compensate for angular accelerations by feeding back the angular acceleration of the payload to the gimbal actuator control input. Again, the angular acceleration measurements may be integrated with position and rate feedback control loops to result in higher bandwidth stabilization for more accurate tracking.

The disclosed gimbal controller systems and methods provide a number of advantages. First, direct sensing and feedback of angular acceleration reduces angular error of a stabilized gimbal payload, particularly for high frequency disturbances or fast tracking commands. Second, the disclosed gimbal controller systems and methods provide significant improvements to gimbal performance at relatively low complexity, especially compared to extensive use of Kalman filters, etc. on modern gimbals. Finally, the gimbal controller systems and methods can be implemented using a distributed acceleration sensor package using COTs linear tri-axial accelerometers on a mass-producible printed circuit board (PCB) assembly.

FIG. 1a illustrates an example fixed wing aircraft 100 generally comprising a fuselage portion 102 and two wings 104 (together defining a wing set). An empennage 106 may be situated at the aft end of the fixed wing aircraft 100. The fixed wing aircraft 100 also includes one or more propulsors 108 coupled to, for example, the wings 104 and/or, as illustrated, the fuselage 102. The propulsor 108 may be arranged in a tractor configuration or, as illustrated, a pusher configuration. A propulsor refers to a mechanical device that gives propulsion and/or thrust to the aircraft including, without limitation, a motor/engine-driven propellers, jet or turbine engines, vectoring motor pods, etc. The wings 104 may employ one or more control surfaces, such as a single conventional aileron configuration or, in the alternative, a plurality of span-wise distributed, independently actuated, ailerons (e.g., wing-borne control surfaces), or flaperons. A winglet 118 may be provided at the distal end of each wing 104 to, inter alia, improve aircraft handling characteristics, enhance safety, and improve efficiency of the fixed wing aircraft 100.

A gimbal-equipped sensor payload pod 120 may be positioned on the fixed wing aircraft 100 to collect data and monitor an area, such as provide intelligence, surveillance, and reconnaissance (ISR) monitoring. For example, the fixed wing aircraft 100 may be equipped with a gimbal-equipped sensor payload pod 120 comprising one or more cameras, audio devices, lasing devices, and other sensors (e.g., EO/IR cameras/sensors). Any video, image, audio, telemetry, and/or other sensor data collected by the aircraft 100 may be stored locally or communicated wirelessly from the aircraft 100 a remote location (e.g., a ground control station) in real time using an antenna coupled with an onboard wireless communication device, such as a transmitter/receiver. Alternatively, such information may be communicated, or otherwise transferred, to the remote location or another party via a wired connection (e.g., if the aircraft is tethered or on the ground). The gimbal-equipped sensor payload pod 120 may employ a tracker to track a designated target. For example, the gimbal-equipped sensor payload pod 120 may employ a laser spot tracker to locate reflected pulses of laser light from a designated target, a laser ranger and marked target seeker (LRMTS), etc. As illustrated, a gimbal-equipped sensor payload pod 120 may be fixed to the forward end of the fuselage 102. However, the gimbal-equipped sensor payload pod 120 may be positioned elsewhere on the fuselage 102 or wings 104.

A gimbal-equipped sensor payload pod 120 may alternatively be used with a multirotor aircraft (a form of VTOL aircraft), which generally comprises a fuselage, a plurality of longitudinal booms extending radially from the fuselage, a set of landing skids or wheels, and a plurality of propulsors. Each of said plurality of propulsors may be positioned at a distal end of a longitudinal boom and oriented to direct thrust downward (relative to the vehicle). The gimbal-equipped sensor payload pod 120 may be coupled to the underside of the fuselage to provide an increased view of the ground.

Figure 1B:
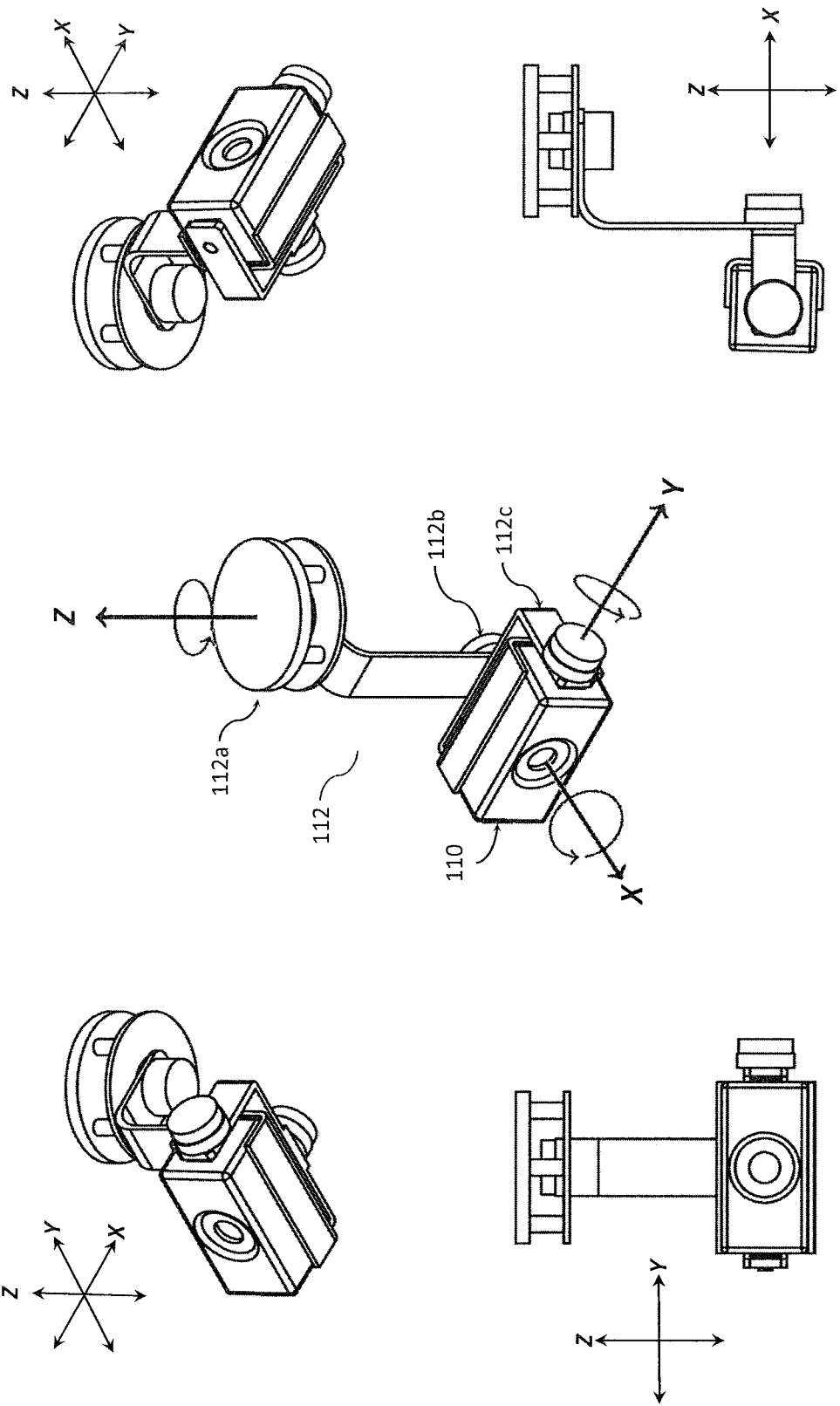
FIG. 1b illustrates at center a perspective view of an exemplary three-dimensional gimbal equipped with a camera, and, in a clockwise fashion starting from the upper left hand corner, a first lower perspective view, a second lower perspective view, a side view, and a front view of the gimbal equipped with a camera.

FIG. 1b illustrates an example three-dimensional gimbal apparatus 112 for use in a gimbal-equipped sensor payload pod 120. Specifically, FIG. 1b illustrates at center a perspective view of an exemplary three-dimensional gimbal equipped with a camera, and, in a clockwise fashion starting from the upper left hand corner, a first lower perspective view, a second lower perspective view, a side view, and a front view of the gimbal equipped with a camera. In some applications, a gimbal may be stabilized about only one axis. As illustrated, the three-dimensional gimbal apparatus 112 comprises three gimbals (i.e., yaw gimbal 112a, roll gimbal 112b, and pitch gimbal 112c) provides rotation about each of the X-axis, Y-axis, and Z-axis (i.e., three axes). These three axes correspond to the roll (X-axis), pitch (Y-axis), and yaw (Z-axis) axes of the aircraft. To measure the angle of rotation of the sensing device to be stabilized (e.g., the camera connected to the three-dimensional gimbal apparatus 112), a measurement signal device, such as a resolver or synchro, may be mounted to yaw gimbal 112a, roll gimbal 112b, and pitch gimbal 112c. The rate of rotation and the angle of rotation are obtained from resolver-to-digital converters.

Movement about each axis may be controlled using one or more gimbal actuators electrically coupled to a gimbal control system. The gimbal actuators, which may output a linear or rotational motion, may employ one or more of hydraulic, pneumatic, electrical, thermal, magnetic, and mechanical actuating techniques. Example gimbal actuators include, for example, motors and motor-driven linear actuators. That is, the gimbal-equipped sensor payload pod 120 is adjusted and controlled by a gimbal control system, which, as discussed herein, may control the gimbal-equipped sensor payload pod 120 based on one or more of (1) a position command, (2) an aircraft/gimbal angular rate measurement, and (3) aircraft/gimbal angular acceleration measurement. While the three-dimensional gimbal apparatus 112 is illustrated as coupled to a camera 110, as noted above, other sensors or devices may be used in lieu of the camera.

The aircraft/gimbal angular rate measurement may be generated using one or more rate sensors that directly measure angular rate, without integration in conditioning electronics. The aircraft/gimbal angular rate measurement may also be determined using a gyroscope. Gyroscopes generally measure a constant rotation rate, while rate sensors also include devices with a low cut off frequency that is other than zero. The aircraft/gimbal angular acceleration measurement may be generated using one or more angular acceleration sensors. For example, U.S. Patent Publication No. US2015/0274504 to Kitai discloses an exemplary angular acceleration sensor and acceleration sensor system. In another example, as will be discussed, angular acceleration may be determined using a bundled distributed acceleration sensing PCB assembly 400.

Figure 2:
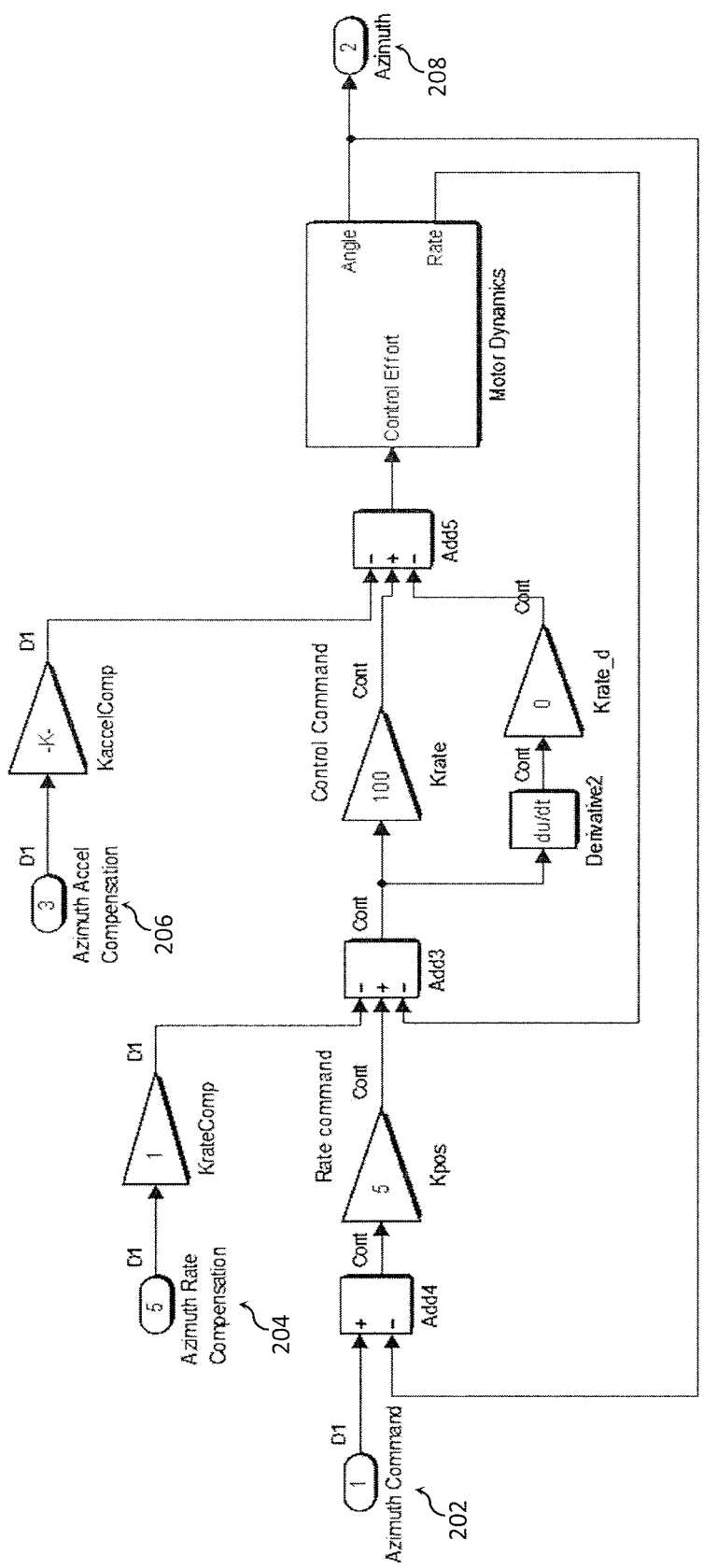
FIG. 2 illustrates an example controller for feeding forward the angular acceleration to the gimbal actuator control input of the gimbal.

FIG. 2 illustrates an example controller 200 for feeding forward the angular acceleration to the gimbal actuator control input of the gimbal to compensate for an angular acceleration imparted on a rigid structure of the aircraft. The position command 202 is in the gimbal frame, and updates as the aircraft 100 maneuvers to rotate the target (or angles) from the inertial frame to gimbal frame to provide the output 208. Hence, there is indirect compensation for aircraft motion in the position command 202, though with phase lag. The rates 204 and accelerations 206 from aircraft motion are fed forward in the gimbal frame. The controller compensates for that motion in the gimbal frame, giving the device mounted on the gimbal a steady inertial view. The position command updates are significant to preventing gimbal drift.

An approach to stabilization is feedforward of aircraft rates to the gimbal controller, but no position command. Human interaction through rate commands centers the gimbal on the target. Over time, the gimbal will slowly drift off the target as rate feedback error integrates. In order to remove that residual error, the position command provides updates by calculating the gimbal angles from target inertial position or inertial angle. The gimbal control inputs are related to each other through integration. Given a steady inertial target and only aircraft angular motion, $\alpha = \int \dot{\alpha} = \int\int \ddot{\alpha}$, where $\alpha$ is the angle position. The position commands will correct for the integrated error of the acceleration and rate compensation. However, it needs to correct with lower bandwidth than rate and acceleration compensation to prevent oscillation or even unstable behavior. The bandwidth of each input to the angle output can be verified through analysis. The varying bandwidths of the control loops and compensation for major disturbances of the system (rates and accelerations) result in the ability to increase the gains of the position command and still maintain stability. This further increases the performance of the gimbal controller for faster, more stable convergence.

The control system is linear time invariant, and thus is subject to standard linear analysis and gain tuning methodologies. System identification of the gimbal system is necessary for optimal gain tuning. The controller 200 motor dynamics model is a mass rotation model centered on the gimbal rotation center. The torque is determined by a motor constant representing the torque of the motor. The dampening is determined by the friction of the motor and the inertia tensor representing the mass properties of the gimbal and mounted sensor. Newtonian physics may be employed to provide the system dynamics. The input to the motor dynamics is the motor voltage. A higher voltage implies a higher torque from the motor. The acceleration compensation is added to the control input to the motor as a torque to produce the angular acceleration that will offset the measured angular acceleration. The required input to compensate for the measured angular acceleration is proportional the required torque. The required torque is the product of inertia about the associated axis (assuming small cross products of inertia and low friction, then $I\alpha = \tau$). As a result, the gain for angular acceleration compensation is proportional to the product of inertia. Added to the acceleration compensation is the rate control. The rate control consists of the commanded rate subtracted by the measured gimbal rate and the platform rate compensation all multiplied by a gain. The input to the rate control is the position error with proportional gain, which produces the commanded rate. The gimbal system dynamics and feedback control together create the system through which gains can be chosen. The gains can be optimized using any available technique, including those for linear systems (e.g., LQR, root locus, or pole placement).

Figure 3A:
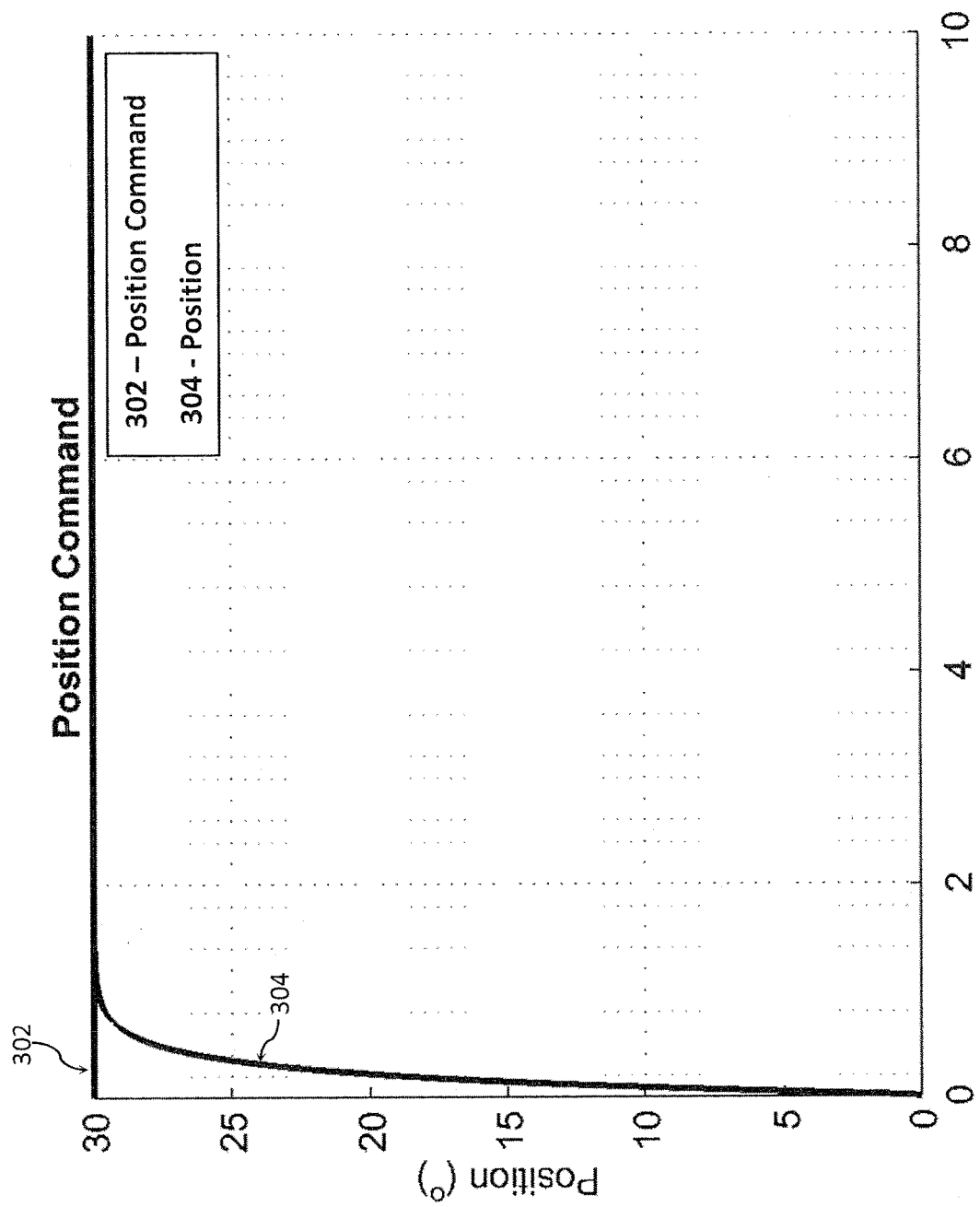
FIG. 3a illustrates an example graph of a position command and the response thereto.
Figure 3B:
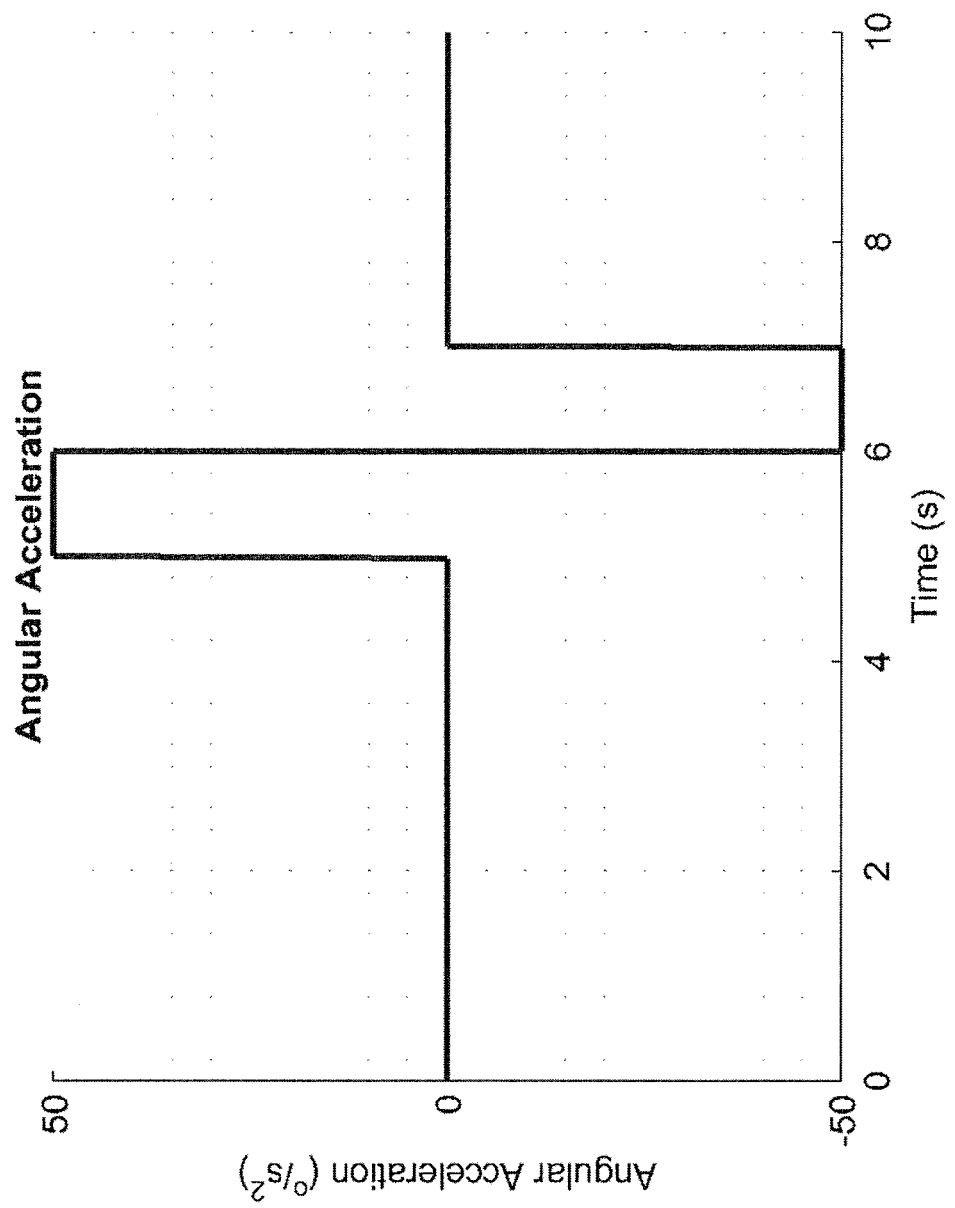
FIG. 3b illustrates an example graph of a delta function in angular acceleration.
Figure 4A:
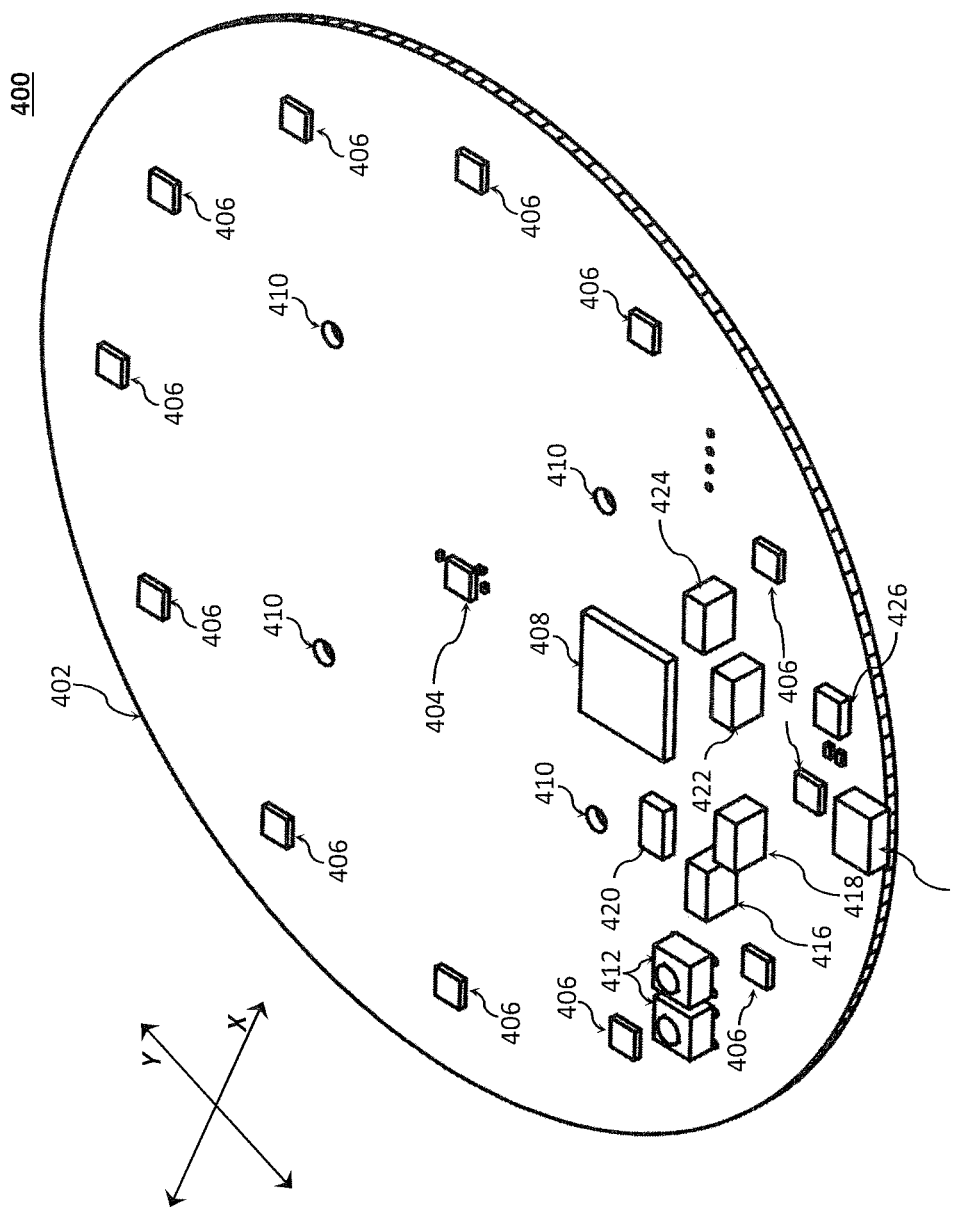
FIG. 4a illustrates a perspective view of an example printed circuit board assembly embodying an angular acceleration sensing system.
Figure 4B:
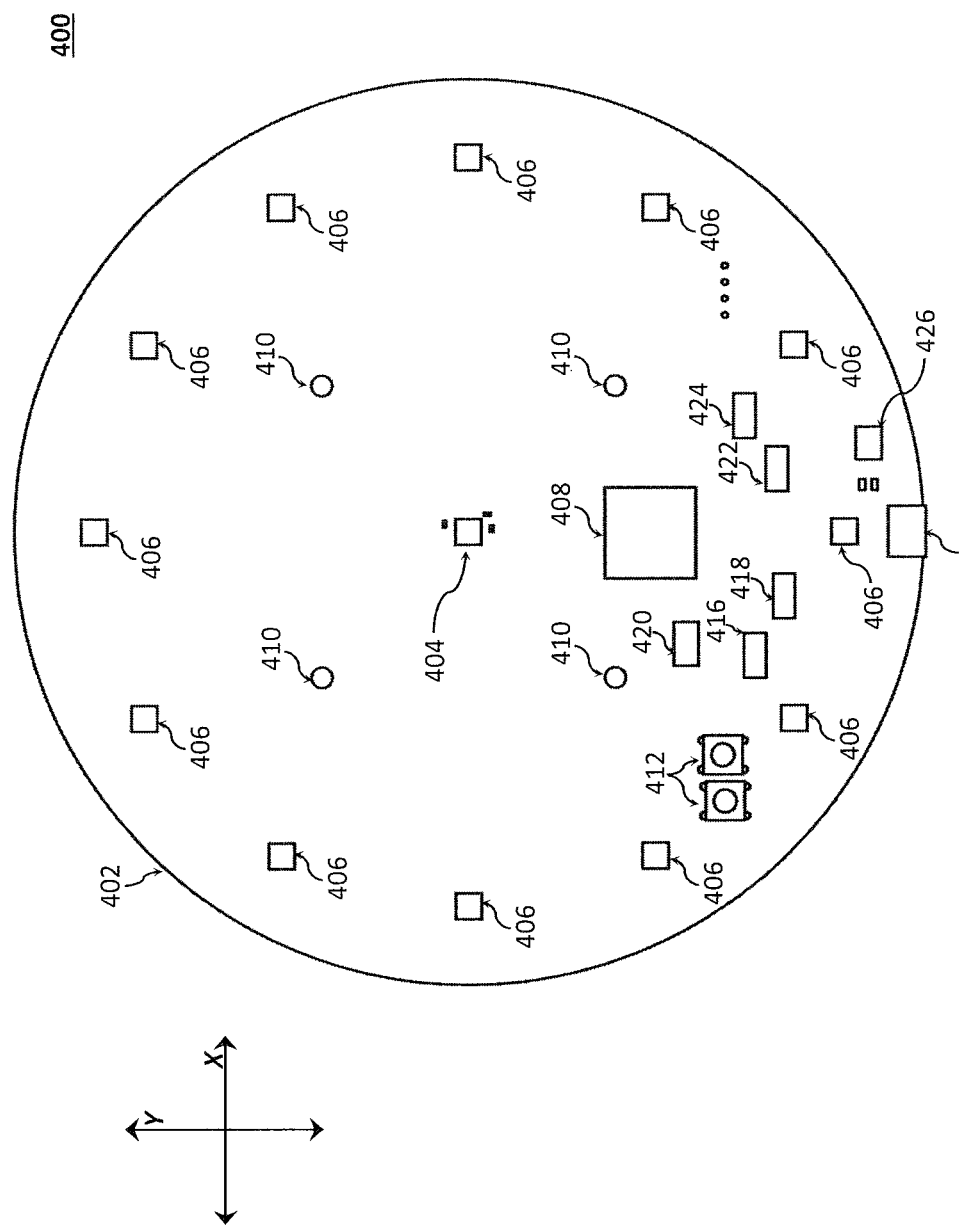
Figure 4C:
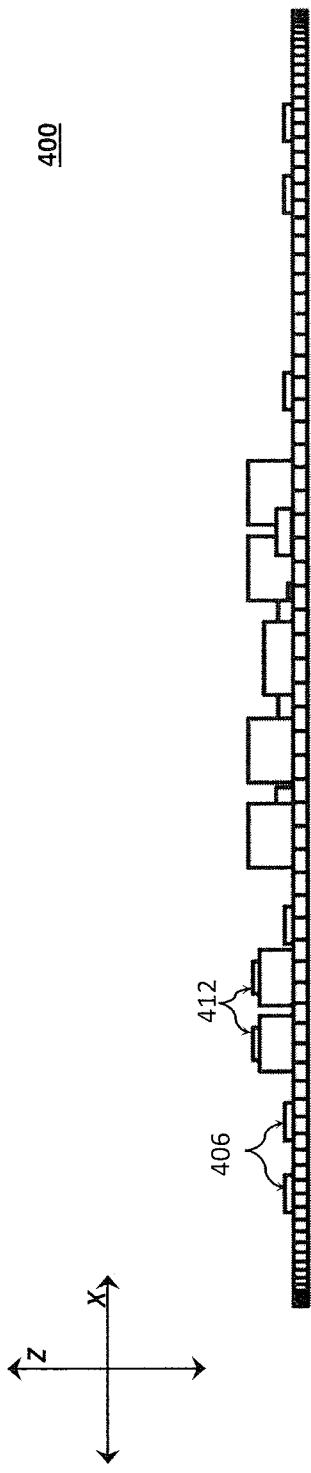
Figure 4D:
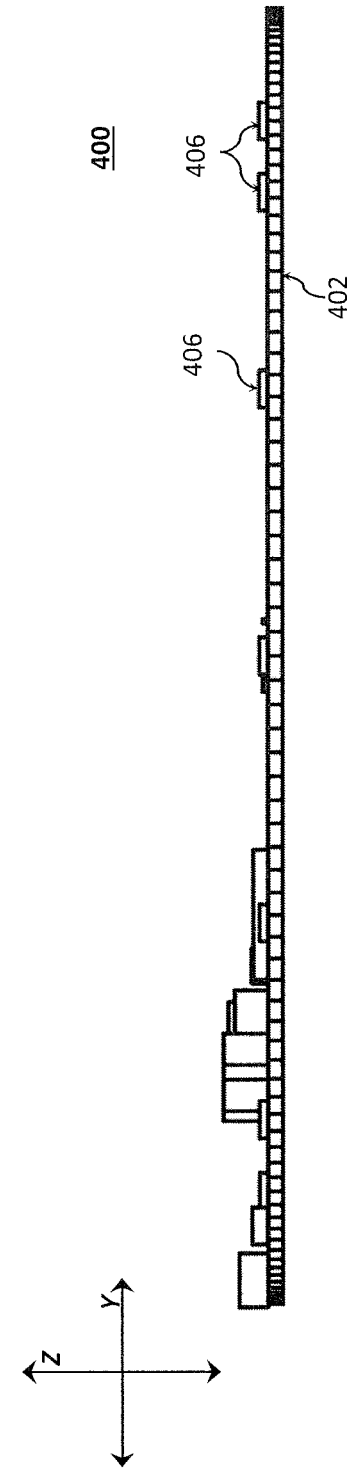

Experimentation through simulation indicates that the addition of angular acceleration feedback may increase performance of gimbal systems. The stability of the position control is proven through linear analysis (as a function of gains). An example of a position command and the response is show in FIG. 3a. As illustrated, the position converges to the position command. An innovative aspect of this controller is the angular acceleration feedback. The signal goes through a gain and subtracts from the control output to the gimbal actuator. The resulting torque from the gimbal actuator compensates for the angular acceleration of the aircraft. In this test case, the rate and acceleration sensors update at 50 Hz. The controller is modeled as continuous, as in implementation it can run many times faster than the sensor update rate. The state feedback is perfect (no error modeling). The test case is a delta function in angular acceleration, shown in FIG. 3b. As illustrated, angular acceleration reduces position error from angular acceleration by as much as 50%. The resulting angular error is shown in FIG. 3c, with and without angular acceleration compensation. As illustrated, angular position converges to commanded value in the presence of angular acceleration disturbance. The feedforward of acceleration measurement results in less error. In view of the forgoing, angular acceleration feedback reduces the position error by approximately 50%, demonstrating that angular acceleration feedback increases performance of gimbal systems.

The angular acceleration may be determined using an angular acceleration sensing system that employs a unique technique of distributing accelerometers about the airframe's center of gravity to estimate the angular acceleration acting on the airframe or gimbal. For instance, an angular acceleration sensing system can be fabricated using a rate gyroscope and a plurality of linear accelerations (e.g., three or more) bundled into a mass-producible printed circuit board (PCB) assembly. The angular acceleration sensing system feeds forward (e.g., via the processor 408 and a communication interface) angular acceleration measurements of the aircraft to a gimbal controller, which in turn causes the gimbal controller to adjust the gimbal to compensate for any disturbance based on said angular acceleration measurement. The angular acceleration measurement, which is a digital or analog signal generated based on measurement data and predictions, may be provided to a gimbal controller before force and displacement of the aircraft occurs, thus allowing the control system to essentially cancel, or offset, the jitter. The output gimbal control signal from the gimbal controller to the gimbal (e.g., to the gimbal actuator control input) may be a digital or analog signal operable to, for example, cause the gimbal to adjust.

The angular acceleration sensing system may be incorporated as a bundled distributed acceleration sensing PCB assembly 400. The distributed acceleration sensing PCB assembly 400 may be positioned on the fuselage 102 and arranged to coincide (e.g., overlap) at least in part with the center of gravity of the airframe—i.e., the mechanical structure of the aircraft 100 minus the propulsors. For example, the combination of the fuselage 102, wings 104, and empennage 106 may define the airframe of the fixed wing aircraft 100, while the combination of the fuselage and longitudinal booms may define the airframe of a multirotor aircraft.

An advantage of the distributed acceleration sensing technology is the ability to employ existing sensors technologies in a new manner to facilitate a novel sensing modality. Existing sensor configurations are not vehicle agnostic, require substantial space on the vehicle, and are difficult to package as an integrated sensor suite. Moreover, many accelerometers currently on the market are not suitable for use aboard small-unmanned aircraft due to size, weight, power, and cost limitations. Further, traditional aircraft flight control is limited to loops that perform estimation and control based on the measured body x, y, and z-axis accelerations and/or the body x, y, and z-axis angular velocities. The body x, y, and z-axis accelerations and angular velocities may be measured by an accelerometer and a gyro respectively, both located at the center of gravity of the aircraft.

A sensor configuration in accordance with the angular acceleration sensing system, however, provides a compact vehicle agnostic sensor configuration that incorporates the accelerometers 406 into a PCB 402 that easily mounts onto, for example, fixed wing aircraft 100 and multirotor aircraft 100b. By placing an accelerometer at a fixed distance from the center of gravity, acceleration measurements from the accelerometer would also contain information about the aircraft's angular acceleration. Feedback or feedforward of such angular acceleration to the gimbal controller enables tighter gimbal control and increased robustness to internal and external uncertainties. The angular acceleration sensing system may employ microelectromechanical system (MEMS) sensors to reduce the effect of noise and bias in a single low-cost, ready to integrate package. Indeed, MEMS-based accelerometers are small, accurate, and readily available.

FIGS. 4a through 4d illustrates an exemplary distributed acceleration sensing PCB assembly 400 embodying distributed acceleration sensing technology. The distributed acceleration sensing PCB assembly 400 may include a rate gyroscope 404 and a plurality of accelerometers 406 arranged on a PCB 402 on a single plane (i.e., the surface of the PCB 402 defines an X-Y plane). Linear accelerometers are devices that measure bidirectional accelerations along an axis. The PCB 402 may further comprise a processor 408, one or more mounting holes 410 (e.g., to mount the PCB 402 to the airframe or to the gimbal), one or more push buttons 412, and other components such as a memory device, signal processing components, and sensors. The one or more push buttons 412 may be used to, for example, power on or off the PCB assembly 400, reset the PCB assembly 400, etc. Further, a Universal Serial Bus (USB) Port 414 may be provided to facilitate wired communication of the acceleration sensing PCB assembly 400 with another device (e.g., a computer). For example, the acceleration sensing PCB assembly's 400 software may be upgraded or reconfigured via a computer coupled to the USB Port 414. That is, a computer may transfer updated software to the acceleration sensing PCB assembly 400 via the USB Port 414. Similarly, information saved to a memory device of the acceleration sensing PCB assembly 400 may be accessed, copied, or updated. In addition to vehicle interfaces to interface with the aircraft (e.g., the gimbal controller), the acceleration sensing PCB assembly 400 may comprise a plurality of expansion interfaces to facilitate the inclusion of additional features or integration with other hardware. For example, the acceleration sensing PCB assembly 400 may comprise, inter alia, a first universal asynchronous receiver/transmitter (UART) 416 to provide a vehicle interface, a second UART 418 to provide an expansion interface, a linear power regulator 420, a first inter-integrated circuit (i2c) port 422 to provide another vehicle interface, a second i2c port 424 to provide another expansion interface, and/or a USB to UART bridge 426.

The distributed acceleration sensing PCB assembly 400 includes a processor 408 operably coupled to the rate gyroscope 404, each of the plurality of accelerometers 406, a memory device having acceleration sensing software installed thereon, and, where applicable, other components of the PCB 402. The processor 408 is configured to execute a feedback or feedforward process and to generate a gimbal actuation signal for the gimbal controller based at least in part on signals received from the rate gyroscope 404 and/or the plurality of accelerometers 406. In operation, the processor 408 performs distributed acceleration sensing methods and processes, which may be stored to the memory device. The distributed acceleration sensing PCB assembly 400 may further receive signals from other sensors, such as pressure sensors and/or strain gauges (e.g., strain gauges on the wings 104).

The rate gyroscope 404 provides a faster response rate compared to other types of gyroscopes, typically at a relatively lower cost. A rate gyroscope 404 differs from other types of gyroscopes in that it indicates the rate of change of angle with time rather than indicating a direction. For example, a MEMS gyro, a form of rate gyroscope 404, works by sonic resonance effects driven by piezoelectric transducers that provide a signal when a rotation occurs.

The rate gyroscope 404 is positioned on the PCB 402 such that, when installed on an aircraft, the rate gyroscope 404 coincides with the center of gravity of the airframe of the aircraft. That is, the rate gyroscope 404 may be positioned to align, at least in part with the center of gravity of the airframe. The center of gravity of the airframe may be determined using known techniques (e.g., using computer-aided design (CAD) software or using known mathematical equations). As can be appreciated by those of ordinary skill in the art, the term center of gravity generally refers to a point at which, if the airframe were suspended, it would be balanced in all positions—i.e., airframe's hypothetical balancing point in all directions. While the rate gyroscope 404 is preferably positioned to align with the center of gravity of the airframe, the rate gyroscope 404 may be positioned at a known point elsewhere on the PCB 402 X-Y plane, where the processer is configured to account mathematically for the off-center deviation from the center of gravity of the airframe.

As illustrated, the rate gyroscope 404 may be positioned such that it is at the center (as defined in an X-Y plane) of the illustrated circular PCB 402, though other shapes are contemplated. More specifically, the rate gyroscope 404 is positioned at the center of the PCB 402 such that it is equidistant from each of a plurality of accelerometers 406. However, the rate gyroscope 404 need not be equidistant from the plurality of accelerometers 406. Notably, incorporating measurements from the rate gyroscope 404 into the sensor fusion estimation software enables placement of all accelerometers 406 in a planar configuration (e.g. on a single PCB). Exemplary suitable accelerometers 406 may include tri-axial linear accelerometers that measure acceleration simultaneously in three axes and linear accelerometers to measure linear acceleration in a single axis. When a tri-axial linear accelerometer is used as the accelerometers 406, at least three tri-axial linear accelerometers are need. Alternatively, a single-axis linear accelerometer may be used, however at least nine single-axis linear accelerometers would be needed. Therefore, the plurality of accelerometers collectively gather at least three axial acceleration measurements (e.g., x, y, and z axes) at three different locations (e.g., locations a, b, and c) for each axis, resulting in a total of nine independent axial acceleration measurements (e.g., xa, xb, xc, ya, yb, yc, za, zb, and zc). In other words, the plurality of accelerometers captures acceleration for all three axes at three separate locations.

Each of the plurality of accelerometers 406 are arranged on a PCB 402 at a predetermined distance from the airframe's center of gravity. A greater distance from the center of gravity to the accelerometer 406 yields a more accurate measurement for that accelerometer 406. In other words, the accelerometers 406 should be positioned as far from the airframe's center of gravity as is possible, while still mounting them on the rigid body (e.g., the airframe). Mounting the accelerometers 406 on the rigid body is advantageous over non-rigid bodies, such as the wing 104, which is typically flexible and therefore it would yield measurements from the accelerometers 406 that are influenced by aeroelastic effects.

Employing an increased number of accelerometers 406 (e.g., more than three tri-axial linear accelerometers or more than nine single-axis linear accelerometers), however, improves the quality of the estimate by introducing a larger number of measurements of the same quantities. That is, the greater the number of accelerometers 406, the more accurate the measurement. Further, such redundancy reduces the effect of individual sensor noise, which has historically shown to be a debilitating problem when employing MEMS accelerometers at high bandwidth. In certain aspects, a combination of tri-axial and single-axis linear accelerometers may be employed, so long as measurements are gathered along at least nine axes (i.e., 3 sets of X, Y, Z measurements at 3 independent, or unique, locations). While twelve tri-axial accelerometers 406 are illustrated, a person of skill in the art would recognize that additional, or fewer, accelerometers 406 may be employed. For example, 3 to 30 tri-axial accelerometers 406, 10 to 20 tri-axial accelerometers 406, or 12 tri-axial accelerometers 406 (as illustrated) may be used.

While the plurality of accelerometers 406 are illustrated as being equidistance from the rate gyroscope 404 and the center of gravity (i.e., positioned in a circle along the circumference of the PCB 402), the plurality of accelerometers 406 need not be equidistant. The distance between the center of gravity of the airframe and each of the accelerometers 406, however, must be known such that it can be accounted for during signal processing by processor 408. The position and orientation of the accelerometers 406 with respect to an airframe reference axis enables the embedded software to estimate the translational and rotational accelerations about the airframe's center of gravity. While the orientation of the accelerometers 406 is illustrated as being axial, other orientations are possible because the measurements from the accelerometers 406 may be adjusted, or otherwise accounted for, using trigonometry.

Figure 5B:
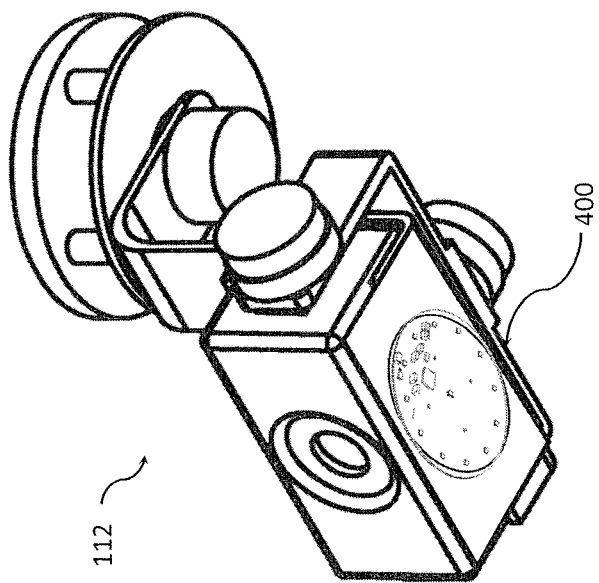
FIGS. 5a and 5b illustrate two exemplary gimbal-equipped sensor payload pods having an angular acceleration sensing system.
Figure 5A:
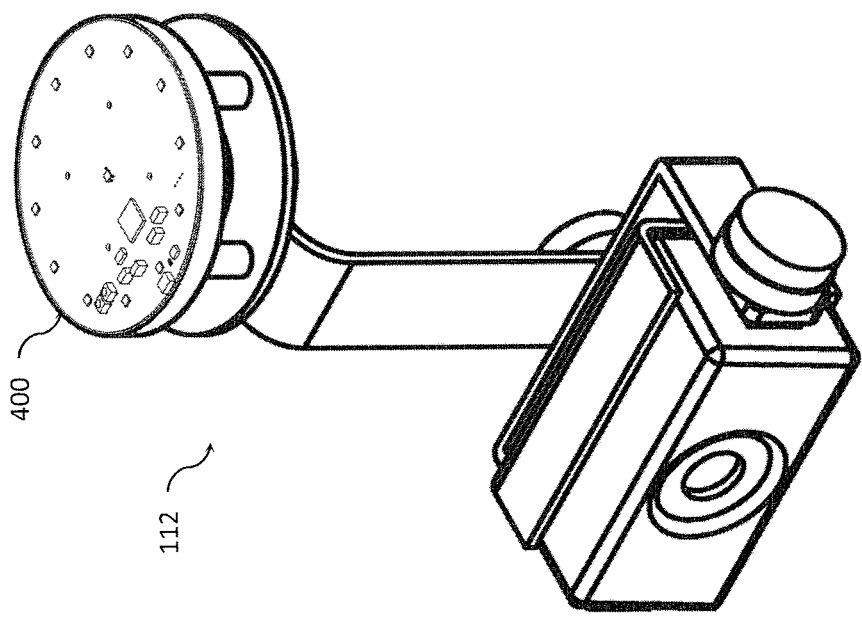

While the accelerometers 406 are generally described as being position on the aircraft, the accelerometers 406, or PCB assembly 400, may alternatively be positioned on other rigid bodies, such as the gimbal itself. FIG. 5a illustrates a first embodiment where the PCB assembly 400 is positioned on a rigid portion of the gimbal. For example, as illustrated, the base of the gimbal that couples to the aircraft may have positioned thereon a PCB assembly 400. Depending on the location of the gimbal on the aircraft, the gimbal may not coincide with the center of gravity of the airframe. FIG. 5b illustrates a second embodiment where the PCB assembly 400 is positioned on the payload (e.g., the camera) of the gimbal. Accordingly, in such cases, the rate gyroscope 404 may be positioned elsewhere on the aircraft (leaving the accelerometers 406 on the gimbal), or the PCB assembly 400 may simply receive rate gyroscope measurement data from another sensor or system of the aircraft. Indeed, the distributed acceleration sensing PCB assembly 400 may further receive inputs (e.g., raw sensor signals) from one or more other sensors, including embedded electronics, to facilitate sensor integration and computations to generate a filtered gimbal actuation signal. The filtered gimbal actuation signal may then be communicated to a gimbal controller to provide an output gimbal control signal to a gimbal actuator of the gimbal. Therefore, the PCB 402 may further comprise one or more integrated electronic sensors. In addition to, or in lieu of, the integrated electronic sensors, the distributed acceleration sensing PCB assembly 400 may be communicatively coupled to one or more sensors positioned throughout the aircraft.

Incorporating measured or modeled mass and inertia properties of a rigid body (e.g., the airframe), to which the distributed acceleration sensing PCB assembly 400 is attached, allows body forces and torques to be directly estimated from the sensor-derived linear and angular accelerations. For example, if the mass and inertial properties of the aircraft (m) are known, the translational and rotational forces (F) can be mathematically determined (i.e., F=ma) by measuring the aircraft accelerations (a). Moreover, the mass and inertia properties are useful for tuning gains for the controller. That is, a reaction to a gust may be dictated in part by the aircraft dynamics.

Each sensor's characteristic parameters may be calibrated using one or more sensor fusion estimation algorithms, such as least squares, maximum likelihood estimation, linear quadratic estimation (e.g., Kalman filtering), etc. Output error parameter estimation techniques can be employed to dynamically estimate accelerations on the rigid body.

Distributed acceleration measurements allow for the separation of the angular from the translational components with the potential to apply each separately. Specifically, an approach of distributed acceleration measurements provides low-noise estimates of the three body-referred translational components of acceleration ($a_x$, $a_y$, $a_z$) along with the nine individual quantities of angular acceleration ($\dot{p}$, $\dot{q}$, $\dot{r}$, $p^2$, $q^2$, $r^2$, pq, pr, qr), where (p, q, r) the body-referred components of angular velocity are (roll rate, pitch rate, and yaw rate).

The total acceleration about each axis can be solved for by comparing measurements from different groups of accelerometers 406 placed away from the center of gravity of the airframe. If all accelerometers can exist on the same plane for a PCB solution (e.g., distributed acceleration sensing PCB assembly 400), the angular rates about the center of gravity are measured with a rate gyro 204. For example, Equation 1 provides an exemplary matrix equation for determining angular accelerations $\dot{p}_b$, $\dot{q}_b$, and $\dot{r}_b$ where the ai-j terms are differences in acceleration measurements between different accelerometer 406, $\Delta$xi-j and $\Delta$yi-j are distances between different accelerometer 406, and $p_b$, $q_b$, and $r_b$ are the angular rates about the x, y, and z axes respectively.

Equation 1

$$\begin{bmatrix} 0 & 0 & \Delta y_{i-j} \\ 0 & 0 & \Delta x_{i-j} \\ \Delta y_{i-j} & \Delta x_{i-j} & 0 \end{bmatrix} \begin{bmatrix} p'_b \\ q'_b \\ r'_b \end{bmatrix} =$$

$$\begin{bmatrix} 1 & 0 & 0 & 0 & \Delta x_{i-j} & \Delta x_{i-j} & -\Delta y_{i-j} & 0 & 0 \\ 0 & 1 & 0 & \Delta y_{i-j} & 0 & \Delta y_{i-j} & -\Delta x_{i-j} & 0 & 0 \\ 0 & 0 & -1 & 0 & 0 & 0 & 0 & -\Delta x_{i-j} & -\Delta y_{i-j} \end{bmatrix} \begin{bmatrix} a_{x,i-j} \\ a_{y,i-j} \\ a_{n,i-j} \\ p_b^2 \\ q_b^2 \\ r_b^2 \\ p_b q_b \\ p_b r_b \\ q_b r_b \end{bmatrix}$$

The first matrix on the right hand side of Equation 1 is not full rank, thus $\dot{p}_b$, $\dot{q}_b$, and $\dot{r}_b$ cannot be solved for with only two tri-axial accelerometers (one i, j pair). However, if measurements are compared between three independent tri-axial accelerometers 406, the result is nine equations accounting for each i, j pair of Equation 1. These equations can then be solved for three separate solutions of $\dot{p}_b$, $\dot{q}_b$, and $\dot{r}_b$ and combined using an estimator, such as a linear least squares solution, to calculate a final estimate of the angular acceleration. The addition of more i, j pair of accelerometers produces additional solutions for the angular acceleration that, when combined, result in a spatial average that reduces noise and increase accuracy without the latency of methods such as temporal averaging. The result is an effective, low-profile angular acceleration sensor using existing sensor components that can be readily integrated with a gimbal controller. Additional advantages include the significant noise improvement without the latency and complexity associated with an observer or Kalman filter. The distributed and redundant nature of the acceleration measurements allows for an instantaneous spatial averaging that reduces noise while replacing the temporal averaging (and attendant latency and added complexity) of a Kalman filter.

Any patents, patent publications, or articles cited herein are hereby incorporated by reference in their entirety. It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

While particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A gimbal stabilizing system for an aircraft having an airframe, the gimbal stabilizing system comprising:
   a gimbal apparatus having at least one gimbal actuator to adjust a position of the gimbal apparatus about an axis, wherein the gimbal apparatus is positioned on the airframe;

a distributed acceleration sensing assembly comprising a rate gyroscope and a plurality of accelerometers and configured to generate an angular acceleration signal reflecting an angular acceleration of the airframe,
    wherein the plurality of accelerometers comprises at least three accelerometers positioned in a single plane, and
    wherein the rate gyroscope is positioned to at least partially align with a center of gravity of the airframe and each accelerometer of the plurality of accelerometers is positioned at a same predetermined distance from the center of gravity; and
a gimbal controller operatively coupled to each of said distributed acceleration sensing assembly and said gimbal apparatus and configured to receive a position command to set the gimbal apparatus on a target,
    wherein the gimbal controller is configured to generate a gimbal control signal using the position command that compensates for the angular acceleration of the airframe based at least in part on a feedback control loop and a feedforward control loop, the feedforward control loop having the angular acceleration signal as an input thereto, and
    wherein the gimbal controller is configured to output the gimbal control signal to said gimbal apparatus to adjust a position of the gimbal apparatus relative to the airframe to maintain the gimbal apparatus on the target.

2. The gimbal stabilizing system of claim 1, wherein the feedback control loop is an angular position and rate feedback control loop.

3. The gimbal stabilizing system of claim 2, wherein the angular position and rate feedback control loop is a proportional-integral-derivative (PID) controller.

4. The gimbal stabilizing system of claim 1, wherein the distributed acceleration sensing assembly comprises a printed circuit board (PCB) assembly.

5. The gimbal stabilization system of claim 1, wherein each of the plurality of accelerometers is a linear tri-axial accelerometer.

6. The gimbal stabilizing system of claim 1, wherein the position command is updated as the aircraft maneuvers to maintain the gimbal apparatus on the target.

7. A gimbal stabilizing system for an aircraft having an airframe, the gimbal stabilizing system comprising:
    a gimbal apparatus having at least one gimbal actuator to adjust a position of the gimbal apparatus about an axis, wherein the gimbal apparatus is configured to couple to the airframe;
    a distributed acceleration sensing assembly positioned on a rigid portion of the gimbal apparatus and configured to generate an angular acceleration signal reflecting an angular acceleration of the rigid portion,
        wherein the distributed acceleration sensing assembly comprises a rate gyroscope and a plurality of accelerometers, wherein the and wherein each accelerometer of the plurality of accelerometers is positioned in a single plane at a same predetermined distance from a center of gravity of the airframe;
    a gimbal controller operatively coupled to each of said distributed acceleration sensing assembly and said gimbal apparatus and configured to receive a position command to set the gimbal apparatus on a target,
        wherein the gimbal controller is configured to generate a gimbal control signal using the position command that compensates for the angular acceleration of the rigid portion based at least in part on a feedback control loop, the feedback control loop having as an input thereto the angular acceleration signal, an angular position of the rigid portion, and an angular rate of the rigid portion, and
        wherein the gimbal controller is configured to output the gimbal control signal to said gimbal apparatus to adjust a position of the gimbal apparatus.

8. The gimbal stabilizing system of claim 7, wherein the feedback control loop is a proportional-integral-derivative (PID) controller.

9. The gimbal stabilizing system of claim 7, wherein the distributed acceleration sensing assembly comprises a printed circuit board (PCB) assembly.

10. The gimbal stabilizing system of claim 7, wherein each of the at least three accelerometers is a linear tri-axial accelerometer.

11. The gimbal stabilizing system of claim 7, wherein the rate gyroscope is positioned to at least partially align with a center of gravity of the airframe.

12. A gimbal stabilizing system comprising:
    a gimbal apparatus having at least one gimbal actuator to adjust a position of the gimbal apparatus about an axis;
    a distributed acceleration sensing assembly comprising a rate gyroscope and at least three accelerometers and configured to generate an angular acceleration signal reflecting an angular acceleration of a rigid body,
        wherein each accelerometer of the at least three accelerometers is positioned in a single plane at a same predetermined distance from a center of gravity of the rigid body; and
    a gimbal controller operatively coupled to each of said distributed acceleration sensing assembly and said gimbal apparatus and configured to receive a position command to set the gimbal apparatus on a target,
        wherein the gimbal controller is configured to generate a gimbal control signal based at least in part on said position command and said angular acceleration signal,
        wherein the gimbal control signal is configured to compensate for the angular acceleration of the rigid body, and
        wherein the gimbal controller is configured to output the gimbal control signal to said gimbal apparatus to adjust a position of the gimbal apparatus.

13. The gimbal stabilizing system of claim 12, wherein the gimbal control signal is generated based at least in part on the angular acceleration signal and an angular position and rate feedback control loop.

14. The gimbal stabilizing system of claim 12, wherein the gimbal control signal is configured to control said at least one gimbal actuator.

15. The gimbal stabilizing system of claim 12, wherein each of the at least three accelerometers is a linear tri-axial accelerometer.

16. The gimbal stabilizing system of claim 12, wherein the rigid body is an airframe.

17. The gimbal stabilizing system of claim 12, wherein the rigid body is a component of the gimbal apparatus.

18. The gimbal stabilizing system of claim 12, wherein the gimbal actuator is motor-driven.

19. The gimbal stabilizing system of claim 12, wherein the gimbal apparatus is a three-dimensional gimbal apparatus.

* * * * *